Figure 1:
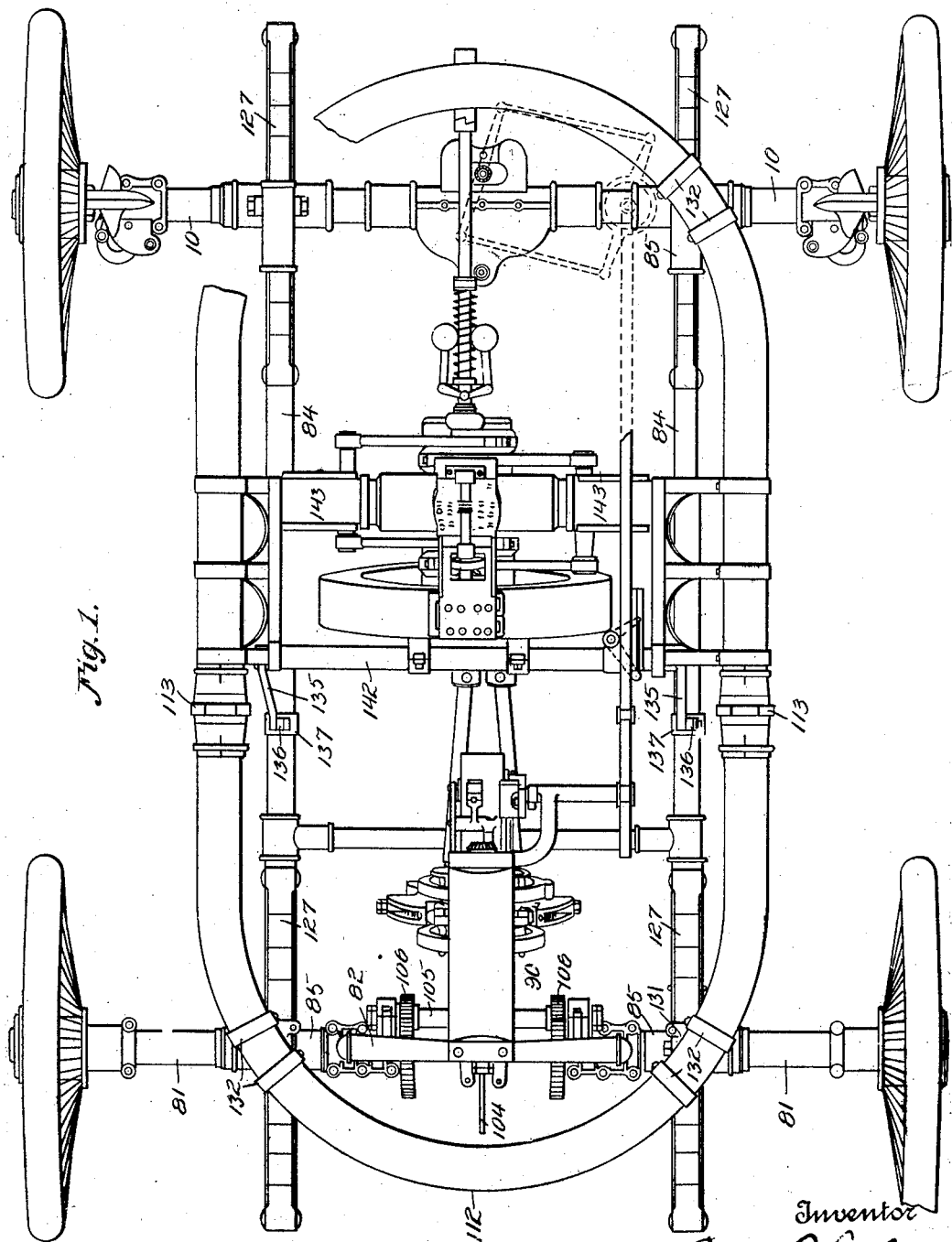

E. P. COWLES.
MOTOR VEHICLE.
APPLICATION FILED AUG. 8, 1912.

1,107,042.

Patented Aug. 11, 1914.

5 SHEETS—SHEET 1.

Witnesses
F. C. Gibson.
B. M. Kent.

Inventor
Edward P. Cowles by Foster Freeman Watson & Coit
Attorneys

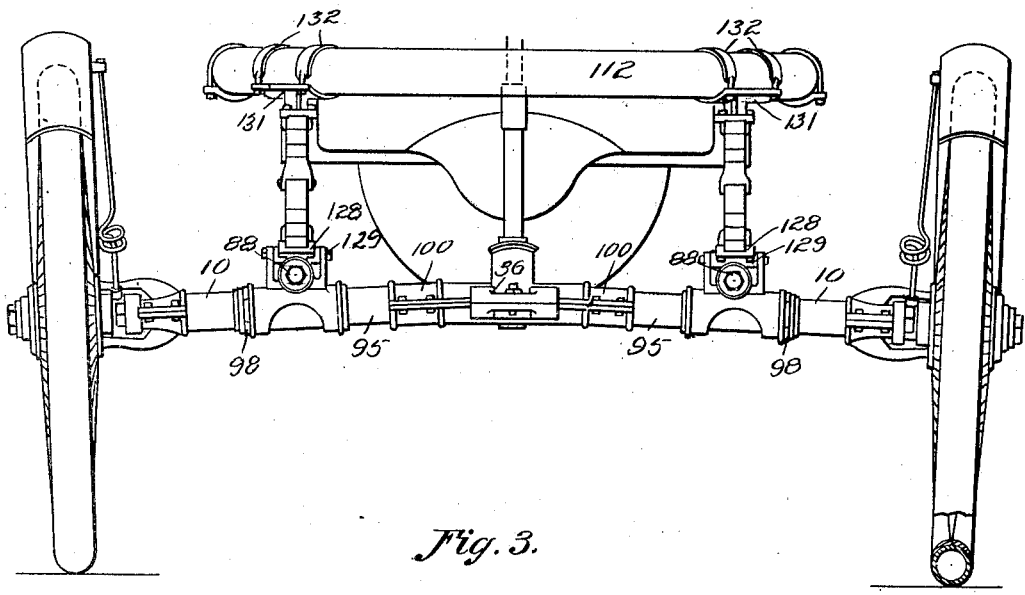
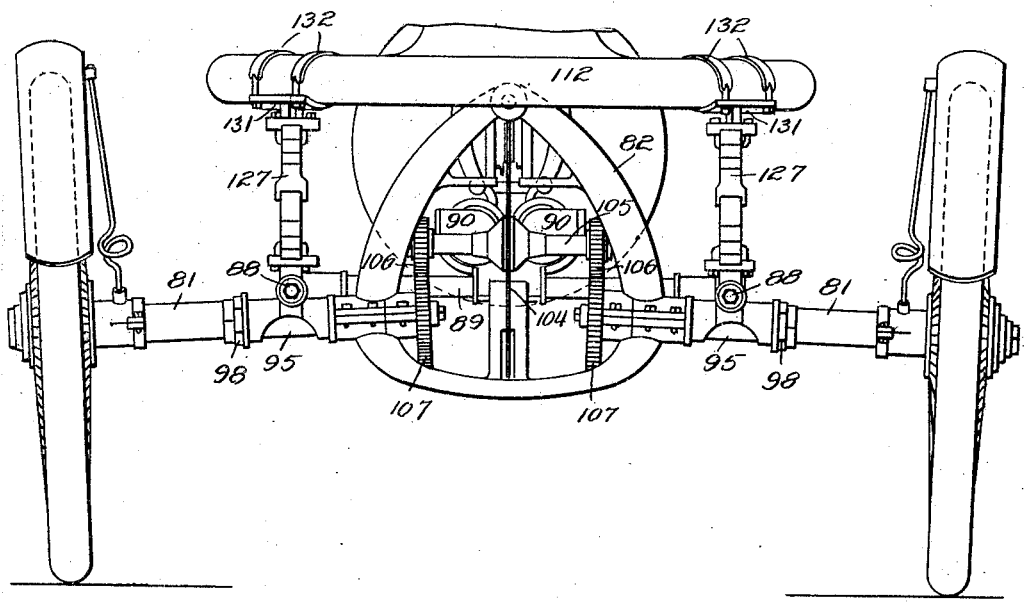

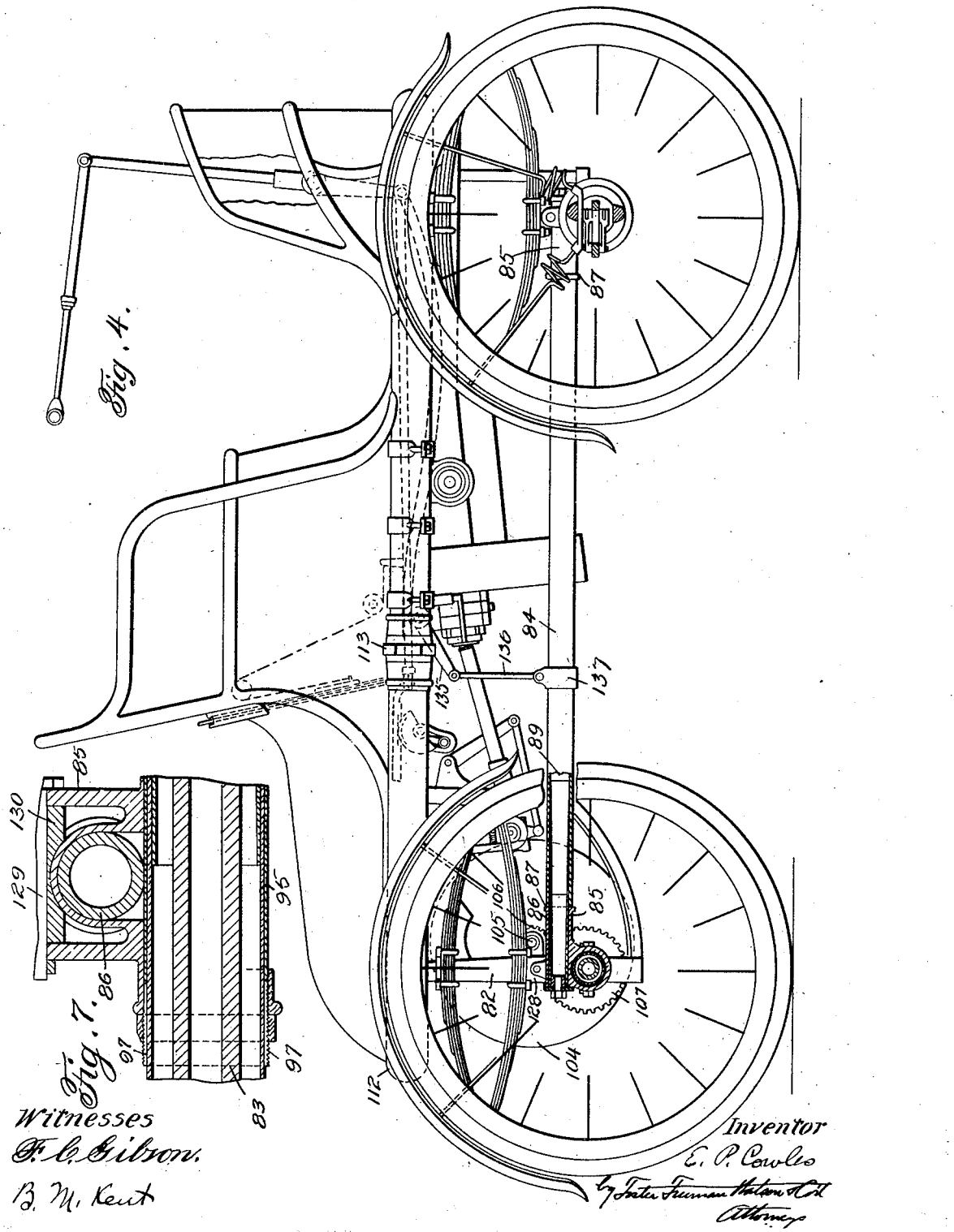

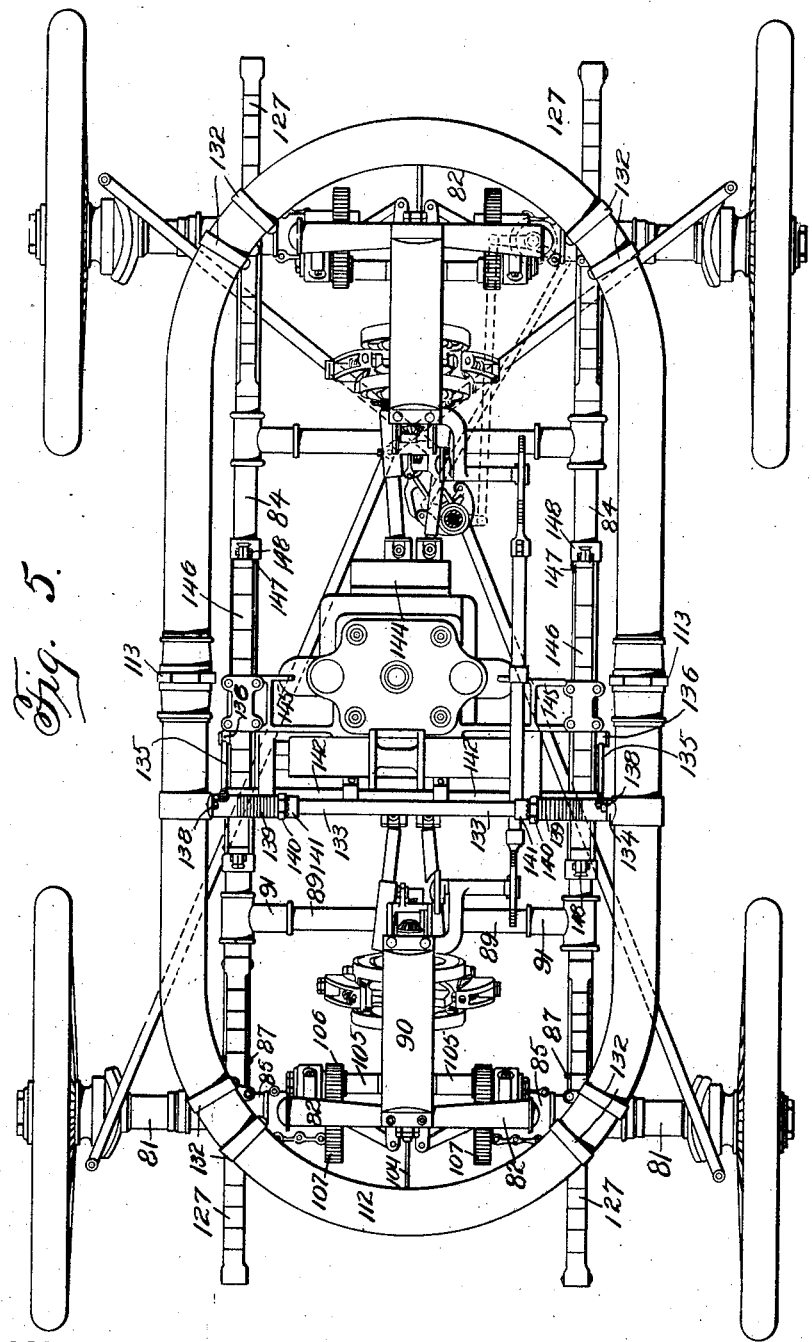

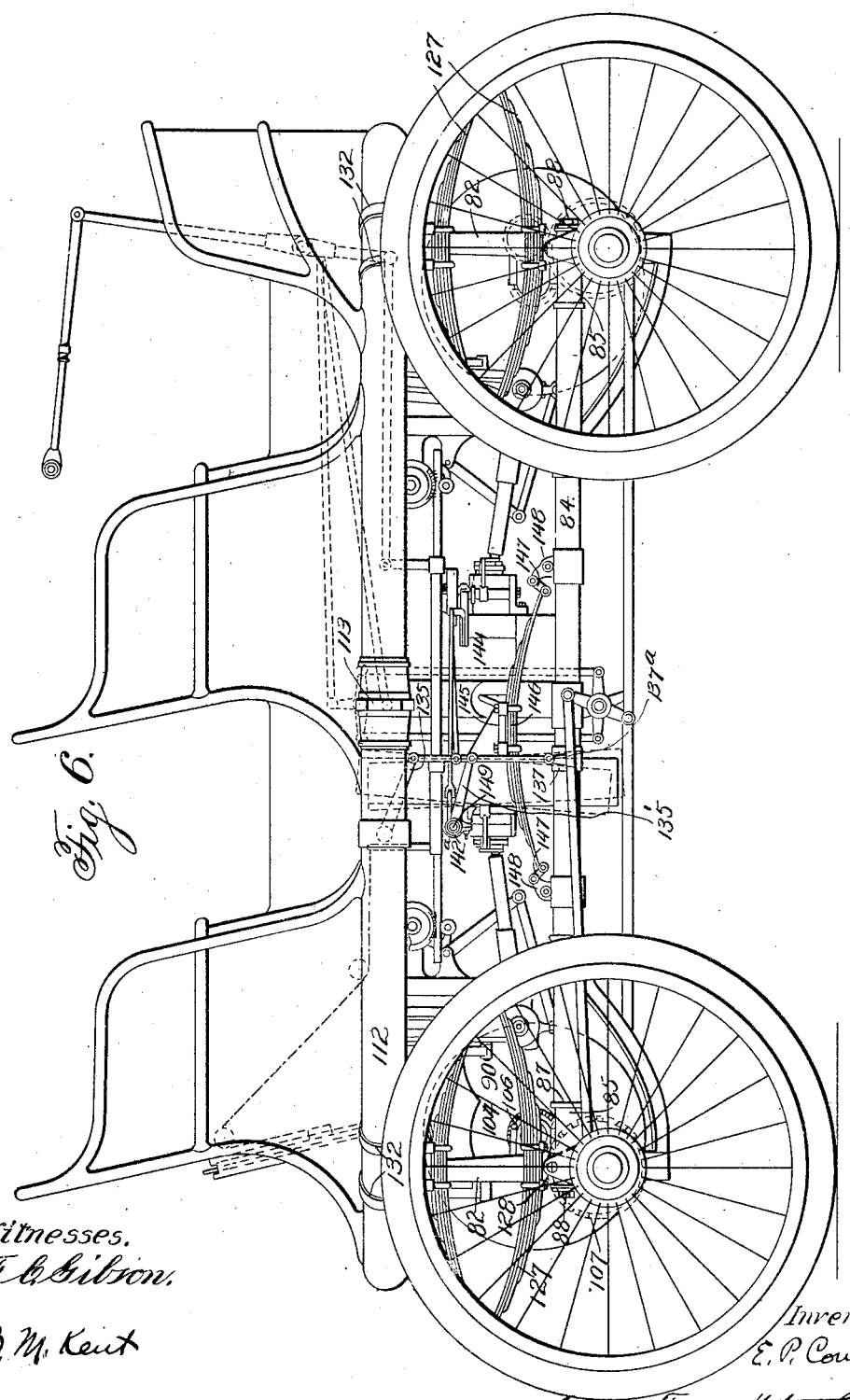

UNITED STATES PATENT OFFICE.

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,107,042. Specification of Letters Patent. Patented Aug. 11, 1914.

Original application filed September 6, 1901, Serial No. 74,497. Divided and this application filed August 8, 1912. Serial No. 714,097.

*To all whom it may concern:*

Be it known that I, EDWARD P. COWLES, a citizen of the United States, residing at Sparta, in the county of Kent and State of Michigan, have invented certain new and useful Improvements in Motor-Vehicles, of which the following is a specification.

This application is a division of my application Serial No. 74,497, filed September 6, 1901.

My present invention relates to improvements in motor vehicles and particularly to the running gear and steering mechanism of such vehicles.

One of the objects of the invention is to provide a running gear frame that is rigid rectangularly and flexible in its horizontal plane.

Another object is to provide a motor vehicle frame of maximum strength and elasticity and of minimum weight, the various members of which can be assembled without brazing and can be conveniently separated and taken apart.

Another object is to provide improved means for mounting a motor on the running gear frame adapted to meet the varied conditions of road work.

With these and other objects in view, the invention consists in the construction and arrangement of parts described in the following specification, reference being had to the accompanying drawings, in which, Figure 1 is a plan view, partly broken away, of a motor vehicle in which the power is applied to the rear wheels only; Fig. 2 is a view of the front end of said vehicle, partly broken away; Fig. 3 is a rear end view of the vehicle illustrated in Figs. 1 and 2; Fig. 4 is a side elevation of the same, parts being shown in section, and a part broken away; Fig. 5 is a plan view of a vehicle in which the power is applied to the front and rear wheels, and in which all four of the wheels are used for steering; Fig. 6 is a side elevation of the vehicle shown in Fig. 5, and Fig. 7 is a vertical section through a portion of the rear axle.

The running gear frame includes a rear axle comprising tubular portions 81, and a central yoke 82. Through the tubes 81 extend the driving shafts 83. The front axle is a single straight tube 10. The axles are connected by two reach bars 84, Fig. 1, the connections between these bars and the axles being made by long bearing T-shaped couplings 85 in which the reach bars and axles are free to turn. Preferably I arrange the member of each of the T couplings through which the reach bars pass above the member through which the axle passes as shown. That part 86 (section Fig. 7) of the reach bars which passes through the coupling 85 is reduced somewhat leaving a shoulder 87 which bears against the end of the coupling. On the end of the reach bar is a nut and washer 88 which bears against the opposite end of the coupling. This prevents longitudinal movement of the couplings on the reach bars. The cross bars 89, that prevent the yokes 82 from turning under the reaction of the driving gear 90 are also connected to the reach bars 84 by freely turning, long bearing T-shaped couplings 91. It will be seen that while the running gear frame is free to twist in its horizontal plane, any change rectangularly is resisted by at least six long bearings which makes the running gear frame in this respect practically rigid. It is obvious that the strain from resisting rectangular change is greatest at the shoulders 87. To give greater strength at these points the main body of the reach bars 84 is cut off so that their ends form said shoulders 87 and a separate tennon 86 of a diameter just sufficient to fit in the bore of tube 84, but of much heavier section, is inserted for a considerable distance into reach bar 84 (Fig. 3) and brazed to it. This heavier section extends into the coupling 85. The part of this reinforcing piece 86 that enters reach tube 84 is reamed out as at 92, to become gradually thinner so as to distribute the strain and vibration all along reach bar 84, and prevent crystallization and eventual breakage. The reach bar 84 could be strengthened by upsetting its end to make it gradually heavier toward the shoulder 87, and the tennon 86 reduced by drawing it down.

Yoke 82 of the rear axle is composed of two parts bolted together, forming semi-hubs in which the tubular portions 81 of said axle are inserted and securely clamped. These tubes bear the weight and strain of the vehicle and it is obvious that the strain is greatest at the point where the tubes enter the yoke hubs and if means were not used to strengthen them here all the strain and vibration would concentrate at this point and the metal would soon crystallize and eventually break. To guard against this I reinforce tube 81 by slipping a tube or sleeve 95, the inside diameter of which is large enough to fit closely the outside of the axle tube 81, over the inner end of the latter. This sleeve, besides reinforcing tube 81, serves another important purpose in that it is extended through the axle member of the T-shaped coupling 85, which bears on the axle 81 just outside of the yoke hub and extends about half way down axle 81, serving as a seat or bearing for the coupling 85, and to protect the axle from the wear of same. Notwithstanding the motion between the couplings 85 and the axles or reach bars is very slight, they keep up a constant chafing thereon, and would eventually wear and weaken them. The tubes 95 project about an inch beyond the out end of the couplings and this end is made tapering and threaded and has a slit 97 on each side. A nut 98 clamps said end of the tube 95 firmly on axle 81. This nut also serves as a shoulder to retain the coupling 85 in place.

The front axle 10, Fig. 2, is built up and reinforced in substantially the same way, except that the tube 10 is a single tube. The casing 36 of the steering mechanism serves as a heavy reinforcement for the center of the front axle, the semi-hubs 100, 100' at each end thereof firmly clamping the tube 10 with short tube 95. The reinforcement 95 is extended the same distance along the axle as is the case with the rear axle previously described and nut 98 clamps the end firmly thereto.

It will be observed that the tubular axles are held between the outside split-hubs and the inner reinforcing tubes much the same as in a vise, the outside hubs answering for one jaw of the vise and the inside reinforcing rings or tubes for the other. It will be seen that this feature of a combined clamp and thread joint with reinforcements, is used throughout the construction, and takes the place of the usual brazed joints. They are fully as strong and secure, and have the advantage of being easily and conveniently assembled and taken apart. The metal is not injured by overheating. They are much more elastic. It will be observed that the axles are built up somewhat like a plate spring, and the principle is much the same, distributing the strain and vibration evenly over every part, making them very strong and elastic. Absolute rigidity in a structure subject to constant jar and concussion is objectionable, and this system gives sufficient elasticity to absorb the vibration and also permits of the various parts being made of steel and hardened. This running gear is specially designed for my driving gear shown in Patent No. 654,716, dated July 31, 1900. This driving gear consists of a driven disk 104 mounted at the middle of a countershaft 105 which is supported in bearings on the rear axle yoke 82, and has at its outer ends pinions 106 which intermesh with spur gears 107, secured to the inner ends of the driving shafts 83. The disk 104 is driven by reduction change speed gearing $90^a$ operated by universally jointed driving shafts $90^b$ which transmit the power from the motor 144 mounted on the body frame. At its middle the shaft 105 is connected by differential gearing, to the disk 104. By making the face of gears 107, and pinion 106 slightly conical and cutting the teeth slightly skewing, I am able to make the driving axle "arching" so as to make the revolving plane of the driving wheels "stand out" radial with the curved section of the road bed.

As hereinbefore stated, the running gear frame which is flexible in its horizontal plane is kept constantly twisting by reason of passing over an uneven road bed. On the contrary the body frame is, or should be, rigid in its horizontal plane. As the two are connected by springs, the body frame is constantly subjected to great twisting strains, which act to speedily destroy a jointed structure. The best disposition of material to resist this strain is a tube of large diameter and light section, practically one piece free from sharp bends. I attain this end by making the body frame of two U-shaped pieces of tubing 112, Figs. 1 and 4, with their straight ends joined together as at 113, forming a frame preferably with semi-circular ends and straight sides. The ends can, however, be elliptical or of any moderate curve or combination of curves. The sides can also be curved vertically to any fancied design.

Preferably the springs 127, connecting the vehicle body with the running gear frame, are of the plain elliptical type, there being two on each axle, of about the same tension, and placed the same distance apart, so that the sway of the body caused by the vertical play of either axle as a wheel runs over an obstruction or drops into a rut, will be half as much as that axle, or a mean between the relative twist of the two axles.

Preferably I attach the springs to the T-shaped couplings 85 directly over the reach bars 84. To relieve the springs from strains caused by the turning effect of the couplings 85 as one corner of the running gear frame is raised I preferably connect the spring seat 128 to the coupling by a pivot joint 129, the hub 130, of which is extended laterally to give a long bearing on the pivot which arrangement holds the spring rigid laterally but allows it to rock slightly longitudinally. The upper bows of springs are attached to tubular body frame 112 by bearings 131, secured to said frame by clips 132. Bearings 131 are extended along tube 112 sufficiently to give a curved seat which prevents them from turning on tube 112. One important advantage gained by making the body frame of the form described, with semi-circular ends is that the springs 127 can be placed relatively near together. As the difference between the flexure of the running gear frame and the rigid body frame has to be accommodated by the springs 127, it is obvious that the strain on the springs and also on the body is much less when the springs are placed near the center, as in this case, than it is when the springs are placed out near the wheel hubs, as is the usual custom. When the supporting springs are placed near the center, as in the present case, the body is much more sensitive to lurching or tilting laterally when passing over rough roads or when turning sharp curves. To prevent this and make it stable in such cases, I place a rock shaft 133, Fig. 5, across the body frame with bearings 134 which are secured by clips to said frame. From each end of this shaft extend short horizontal arms 135 and pivotally connected to the outer ends of these arms are two links 136, Fig. 3, which extend down and are pivoted to each of the reach bars of the running gear frame by clips 137. It is obvious that while the body is perfectly free to play up and down its plane is held rigidly parallel with a line passing through the two pivots 137ª, on the reach bars and as the pivots 137ª are placed as near midway between the two axles as possible, it is obvious that the plane of the body frame will always take the mean between the two horizontal planes passing through the front and rear axle at whatever angle they may make with respect to each other, or when any wheel runs over an obstruction or drops into a depression, the body will tilt one-half as much as the axle supported by that wheel.

When the vehicle is moving at a very high speed imperfections in the road bed would produce concussions that if the arms 135 were rigidly fastened to shaft 133 would endanger breaking or bending of parts, or give unpleasant jolts to occupants. To remedy this I mount the arms 135 loosely on shaft 133 and provide stops 138 that prevent said arms from turning down but allow them to turn up to a limited extent. Coiled springs 139 fitted around the shaft each having one end attached to a hub of an arm 135 and the other end to a collar 140 force the arms 135 down against stops 138. For all ordinary conditions the rocker arms 135 act the same as though attached rigidly to the shaft 133, but with an unusual jolt they yield and relieve parts of undue strain. The collar 140 is loose on shaft 133 and has ratchet teeth cut in the face opposite spring 139, which engage with corresponding teeth cut in the face of a collar 141 which is firmly fixed on shaft 133. By turning collar 140 any degree of tension desired can be given to the springs 139.

When the motor is attached directly to the body frame in the usual manner as shown in Figs. 1, 2 and 3, which illustrate a type of motor vehicle in which only the rear wheels are driven and which plan is followed in constructing the lightest and smallest forms of such vehicles, the rocker shaft 133 passes through and has bearings in a tube 142, which is a fixed part of the motor frame 143. In this case besides the function above described the rocker shaft 133 serves another important purpose. The requirements of the driving gear, for which my present improvements are specially adapted as hereinbefore mentioned, necessitates a longitudinally disposed motor shaft. This causes the torque reaction, which is very considerable and intermittent in explosive motors, to act laterally on the body, which would cause an objectionable tilting of same. By fixing the rocker shaft 133 in the motor frame as shown, the torque reaction is transmitted direct to the running gear and wheel base, and the body entirely relieved of its effects.

In Figs. 5 and 6 is illustrated a modification of my invention in which the motor is mounted on the running gear frame instead of the body frame. Extending laterally and horizontally from the sides of the motor 144, near its center of gravity are brackets 145, their outer ends being bolted firmly to, preferably, half elliptical, spring 146. The ends of these springs are connected by links 147 to short posts 148, secured by clips to the reach bars 84. These springs are placed as near as possible midway between the axles, for reasons that have been hereinbefore explained. The elasticity of the springs accommodates the vertical twisting of the reach bars, and as in this position it partakes of but half the vertical play of the axles, the half springs cause the motor to ride as smoothly as if mounted in the body. In this embodiment of my invention I employ, besides the rock shaft 133 before described, an additional rock shaft 149 which extends through a tube 142ª secured to the motor and acting to transmit torque reaction to the running gear and wheel base. This rock shaft 149 may have arms 135' rigidly attached to it.

Referring again to my Patent No. 654,716, July 31, 1900, it will be seen that the motor therein described is completely self contained and is flexibly and extensibly connected to the driving gear. Therefore the motor shaft can be deflected considerably from its normal position without interfering with the transmission of power from the motor to the driving gear, or impairing the efficient working, and consequently the motor is free to play up and down with the springs or oscillate in any direction, the elasticity of the spring allowing it, to a limited extent, to rock laterally or horizontally and the links 147 allowing it to vibrate longitudinally and in the case of a chain drive, accommodate a distance piece to regulate tension of chain and twist horizontally. This manner of mounting a self-contained motor flexibly has one other important advantage. The heavy balance wheel necessary on all explosive motors revolving at a high rate of speed—from 600 to 1000 revolutions per minute—acts as a powerful gyroscope that resists with great force any sudden change in its plane of revolution, and the motor of the vehicle over an uneven road bed has a tendency to constantly change the plane of revolution of this wheel resulting in subjecting the motor and vehicle frame to great strains. This strain is most direct and severe on the motor shaft and bearings, and has a very destructive effect. With a self-contained motor mounted flexibly, as hereinbefore described, the gyrostatic action of the balance wheel is accommodated. For instance, if either set of wheels were to drop into a depression or run over an obstruction changing the plane of the running gear, the gyrostatic priciple would cause the balance wheel to oscillate with respect to the running gear and as the flexible mounting hereinbefore described accommodates this oscillation, all of the parts are relieved from strain. Practically the balance wheel controls and steadies the motor and gives it stability.

The motor frame can be extended to carry the accessories, such as oil tank, water tank, steam generator, storage battery, etc., according to the kind of motor employed. Preferably I would place these accessories in the body frame and connect them to the motor by flexible conduits. That for water, steam, compressed air, etc., could be common hose. That for oil could be jointed pipe of a form well known to persons skilled in the art.

It will be observed that by my principle of construction—light tubular built up axles connected by tubular reach bars combined with tubular body frame as shown and described—can be extended and modified to meet the requirements of any kind of motor vehicle traffic, as for instance to light runabouts, delivery wagons, etc., or to passenger coaches, omnibuses, heavy drays, etc., the division and distribution of the tractive force and lessening of dead weight making soft or pneumatic tires practicable for all purposes. It will also be observed that the primary object of my invention is not merely to reduce the weight in a general way, nominally, but to devise a system of construction by which every ounce of useless metal is dispensed with, permitting a selection and disposition of material, giving the greatest possible strength and elasticity with the least possible amount, with a view of reducing the weight to the lowest possible limit, much the same as in modern bicycle construction. Preferably I would make all parts of carbon steel hardened to a spring or saw temper, except in some cases where aluminum could be used to better advantage, the manner of construction admitting of this being done.

Having thus described my invention what I claim and desire to secure by Letters-Patent is:

1. In a motor vehicle, the combination of a running gear, a body frame, springs arranged between said running gear and body frame, a rock shaft mounted in bearings on and extending transversely of the body frame, arms loosely mounted on said shaft, links connecting said arms with the running gear, and means for limiting the movement of said arms about the rock shaft in one direction.

2. In a motor vehicle, the combination of a running gear, a body frame, springs arranged between said frame and running gear, a rock shaft mounted on said body frame, and links connecting the running gear with arms on said rock shaft, said arms being connected to said shaft to normally move therewith but adapted to move independently of said shaft when subjected to unusual strain.

3. In a motor vehicle, the combination of a running gear, a body frame, springs arranged between said frame and running gear, a rock shaft mounted on the body frame, arms loosely mounted on said shaft, stops for limiting the movement of said arms on the rock shaft in one direction, springs for holding the arms against said stops, and links connecting said arms and the running gear.

4. In a motor vehicle, the combination of a running gear, a body frame, springs arranged between said frame and running gear, a rock shaft mounted on the body frame, arms loosely mounted on said shaft, stops for limiting the movement of said arms in one direction, springs for normally holding said arms against the stops, connections between said arms and the running gear, and means for adjusting the tension of the springs.

5. In a motor vehicle, the combination of a running gear, a body frame, springs supporting the body frame, a rock shaft mounted on the body frame, arms loosely mounted on said shaft, stops for limiting the movement of said arms on the shaft in one direction, collars loosely mounted on the shaft, springs connected to said collars and said arms for normally holding the arms against said stops, and means for locking the collars to the shaft in any adjusted position, whereby the tension of the springs can be varied.

6. In a motor vehicle, the combination of a running gear, a body frame, springs supporting the body frame, a motor mounted on the body frame, a rock shaft mounted in bearings connected with the motor frame or casing, and links connecting arms on said shaft with the running gear, whereby strains on the motor will be transmitted directly to the running gear.

7. In a motor vehicle, the combination of running gear, a body frame, springs supporting the body frame, a motor mounted on the body frame, a rock shaft extending at right angles to the motor shaft and mounted in bearings connected with the motor, and links connecting arms on said shaft with the running gear, whereby the body frame is relieved of the effect of the torque of the motor and is maintained parallel with the axles.

8. In a motor vehicle, the combination with a tubular rear axle having driving axle sections therein, of a spring supported body frame, a motor mounted upon and wholly supported by the body frame, a driving shaft extending from the motor to the rear axle, gearing between said driving shaft and said axle sections for driving the latter whereby torque reaction on the axle is created, means connected to the axle for absorbing said torque reaction, and connections from said means to the body frame.

9. In a motor vehicle, the combination with a front axle and a tubular rear axle having driving axle sections therein, of a spring supported body frame, a motor mounted on the body frame, a driving shaft extending from the motor to the rear axle, gearing between said driving shaft and said axle sections for driving the latter, whereby torque reaction on the rear axle is created, means independent of the body supporting springs and connected to the rear axle for absorbing said torque reaction, and connections from said means to the body frame intermediate said axles.

10. In a motor vehicle, the combination with a tubular rear axle having driving axle sections therein, of a body frame, a motor mounted on the body frame, a driving shaft extending from the motor to the rear axle, gearing between said driving shaft and said axle sections for driving the latter whereby torque reaction on the axle is created, means connected to the axle for absorbing said torque reaction, connections from said means to the body frame, and springs supporting the body frame from the axle and having pivoted connections permitting rocking of the springs independently of said means.

11. In a motor vehicle, the combination with a tubular rear axle having driving axle sections therein, of a body frame, a motor mounted on the body frame, a driving shaft extending from the motor to the rear axle, gearing between said driving shaft and said axle sections for driving the latter whereby torque reaction on the axle is created, means connected to the axle for absorbing said torque reaction, connections from said means to the body frame, and springs rigidly connected to said body frame and supporting the body from said axle through pivotal connections permitting rocking of the springs independently of said means.

12. In a motor vehicle, the combination with a front axle and steering wheels thereon, the rear axle having driving axle sections therein and driving wheels connected to said sections and supporting the axle, and a body frame supported on springs on said axles, of a motor mounted upon and wholly supported by said body frame with its axis arranged longitudinally thereof and midway between the sides of the frame, a driving shaft extending from the motor to the rear axle, a differential or balance gear on the rear axle connected to said driving axle sections, gearing between said driving shaft and said differential gear whereby torque reaction is created on the rear axle, means connected to the rear axle for absorbing said torque reaction, and connections from said means to the body frame intermediate said axles.

13. In a motor vehicle, the combination of axles, a body frame, springs between the axles and frame, a motor supported wholly upon the body frame, driving connections from the motor to the rear axle, rods extending forwardly from said rear axle and adapted to take the torque reaction thereof, and link connections from said rods to said body frame intermediate said axles.

14. In a motor vehicle, the combination with a tubular rear axle having driving axle sections therein, of a spring supported body frame, a motor mounted upon and wholly supported by the body frame, a driving shaft extending from the motor to the rear axle, gearing between said driving shaft and said axle sections for driving the latter whereby torque reaction on the axle is created, means connected to and extending forwardly from the axle for absorbing said torque reaction, and connections from said means to the body frame adjacent the center of the vehicle.

15. In a motor vehicle, the combination with a front axle and steering wheels thereon, the rear axle having driving axle sections therein and driving wheels supporting the axle and connected to said sections, and a body frame supported on springs on said axles, of a motor mounted upon and wholly supported by said body frame with its axis arranged longitudinally thereof, a universally jointed driving shaft for transmitting power from the motor to the rear axle, a differential or balance gear on the rear axle connected to said driving axle sections, gearing between said driving shaft and said differential gear, means connected to and extending forwardly from the rear axle for absorbing the torque reaction, and connections from said means to the body frame adjacent the rear end of the motor.

16. In a motor vehicle, the combination with a front axle and steering wheels thereon, the rear axle having driving axle sections therein and driving wheels supporting the axle and connected to said sections, and a body frame supported on springs on said axles, of a motor mounted upon and wholly supported by said body frame with its axis arranged longitudinally thereof, a driving shaft for transmitting power from the motor to the rear axle, a differential or balance gear on the rear axle connected to said driving axle sections, reduction change speed driving gearing between said driving shaft and said differential gear, means connected to and extending forwardly from the rear axle for absorbing the torque reaction, and connections from said means to the body frame intermediate said axles.

17. In a motor vehicle, the combination with a front axle and steering wheels thereon, the rear axle having driving axle sections therein and driving wheels supporting the axle and connected to said sections, driving gearing and differential gearing mounted on the rear axle and connected to drive said axle sections, and a body frame supported on springs on said axles, of a motor mounted upon and wholly supported by said body frame with its axis arranged longitudinally thereof, driving means for flexibly and extensibly connecting said motor to said driving gearing, means connected to and extending forwardly from the rear axle for absorbing the torque reaction, and connections from said means to the body frame intermediate said axles.

In testimony whereof I affix my signature in presence of two witnesses.

EDWARD P. COWLES.

Witnesses:
 BERT BEST,
 IVAN L. SMITH.

---

Copies of this patent may be obtained for five cents each, by addressing the "Commissioner of Patents, Washington, D. C."